(12) United States Patent
Breß et al.

(10) Patent No.: US 11,907,221 B2
(45) Date of Patent: *Feb. 20, 2024

(54) SCHEDULING PARALLEL EXECUTION OF QUERY SUB-PLANS

(71) Applicant: Snowflake Inc., Bozeman, MT (US)

(72) Inventors: Sebastian Breß, Berlin (DE); Moritz Eyssen, Berlin (DE); Max Heimel, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,770

(22) Filed: May 31, 2022

(65) Prior Publication Data

US 2023/0195729 A1 Jun. 22, 2023

Related U.S. Application Data

(63) Continuation of application No. 17/647,629, filed on Jan. 11, 2022, now Pat. No. 11,379,480.

(60) Provisional application No. 63/265,606, filed on Dec. 17, 2021.

(51) Int. Cl.
*G06F 16/245* (2019.01)
*G06F 16/2453* (2019.01)

(52) U.S. Cl.
CPC .. *G06F 16/24545* (2019.01); *G06F 16/24532* (2019.01); *G06F 16/24537* (2019.01)

(58) Field of Classification Search
None
See application file for complete search history.

(56) References Cited

U.S. PATENT DOCUMENTS

| | | | |
|---|---|---|---|
| 7,051,034 B1* | 5/2006 | Ghosh | G06F 16/90335 707/E17.14 |
| 2004/0122845 A1* | 6/2004 | Lohman | G06F 16/24532 707/999.102 |
| 2005/0131877 A1 | 6/2005 | Ghosh et al. | |
| 2006/0080285 A1* | 4/2006 | Chowdhuri | G06F 16/24532 |
| 2009/0254916 A1* | 10/2009 | Bose | G06F 16/2455 718/104 |
| 2011/0040810 A1* | 2/2011 | Kaplan | G06F 16/17 707/822 |
| 2012/0005188 A1* | 1/2012 | Yu | G06F 16/24532 707/718 |
| 2013/0212085 A1* | 8/2013 | Nica | G06F 16/24532 707/718 |

(Continued)

OTHER PUBLICATIONS

"U.S. Appl. No. 17/647,629, Notice of Allowance dated Apr. 1, 2022", 17 pgs.

*Primary Examiner* — Son T Hoang
(74) *Attorney, Agent, or Firm* — Schwegman Lundberg & Woessner, P.A.

(57) ABSTRACT

Sub-plans are executed in parallel using a plurality of execution nodes, which can be part of a data platform. In particular, various embodiments identify sub-plans (e.g., fragments or portions of one or more child operators) of a root operator in a query plan such that the identified sub-plans that are candidates for execution on a single execution node, determine a cost estimate for causing the candidate sub-plans to be executed in parallel using multiple execution nodes, and cause the candidate sub-plans to be executed in parallel based on the cost estimate.

30 Claims, 9 Drawing Sheets

(56) References Cited

U.S. PATENT DOCUMENTS

| | | | |
|---|---|---|---|
| 2013/0318068 A1* | 11/2013 | Apte | G06F 16/24532 |
| | | | 707/718 |
| 2014/0114952 A1* | 4/2014 | Robinson | G06F 16/24532 |
| | | | 707/718 |
| 2015/0039648 A1* | 2/2015 | Mukherjee | G06F 16/24568 |
| | | | 707/769 |
| 2018/0173753 A1* | 6/2018 | Pei | G06F 16/2453 |
| 2021/0191942 A1* | 6/2021 | Arnold | G06F 16/8365 |

* cited by examiner

SCHEDULING PARALLEL EXECUTION OF QUERY SUB-PLANS

CROSS-REFERENCE TO RELATED APPLICATIONS

This application is a Continuation of U.S. patent application Ser. No. 17/647,629, filed Jan. 11, 2022, which claims priority to U.S. Provisional Patent Application Ser. No. 63/265,606, filed Dec. 17, 2021, which are incorporated by reference herein in their entireties.

TECHNICAL FIELD

Embodiments of the disclosure relate generally to databases and, more specifically, to executing query sub-plans in parallel using multiple execution nodes, which can be used in connection with a data platform.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
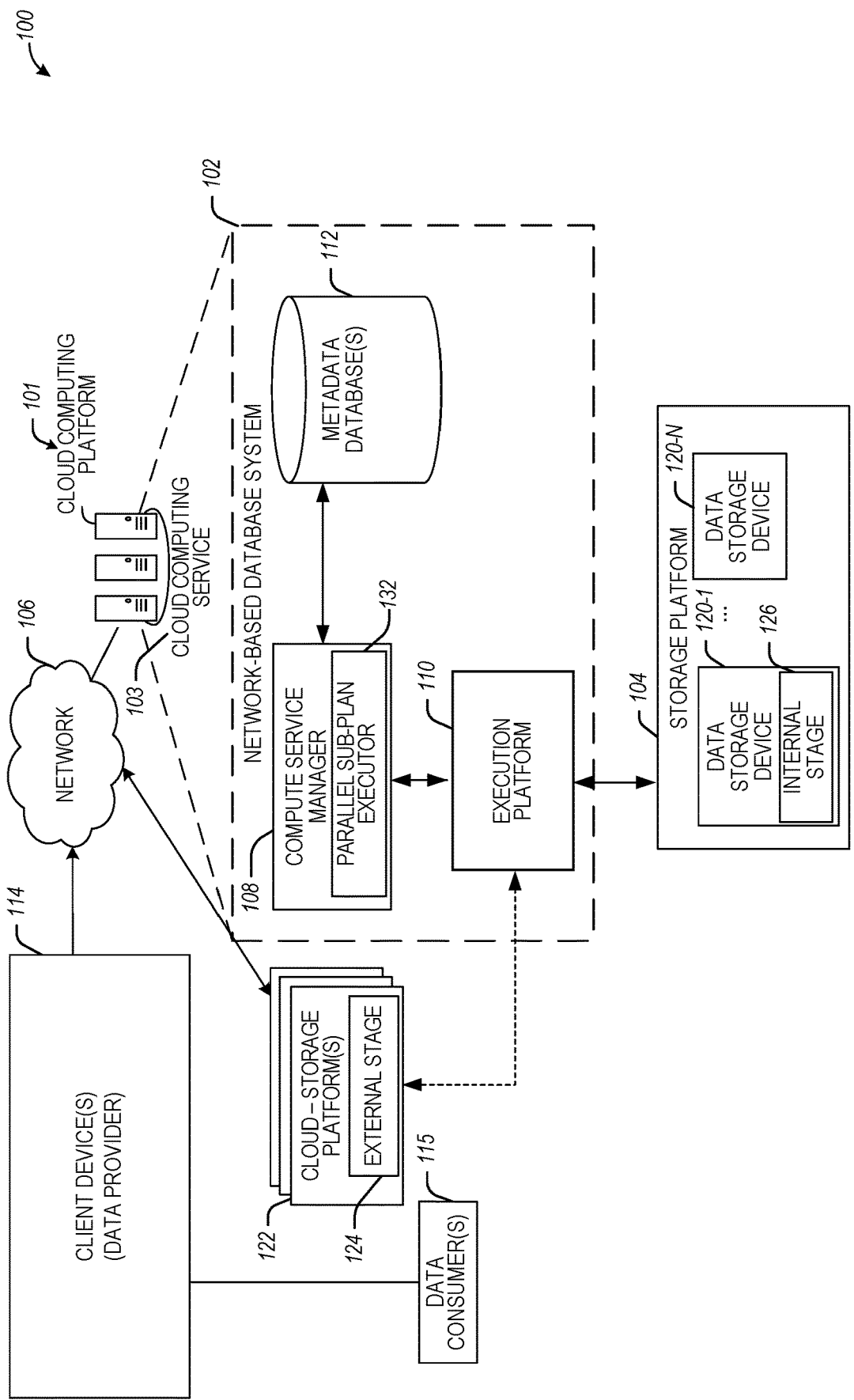
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems. Databases may include one or more tables that include or reference data that can be read, modified, or deleted using queries. Querying very large databases and/or tables might require scanning large amounts of data.

In a typical implementation, a data platform includes one or more databases that are maintained on behalf of a customer account. The data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth.

For various implementations of a data platform, a cluster of execution nodes can be used to execute tasks (e.g., workload) with respect to the data platform, such as execution of a query plan on the data platform, where the query plan comprises a plurality of operators. For example, a first operator in the query plan can be executed (e.g., processed) by one or more execution nodes to generate a first result and, based on the first result, a second operator in the query plan can be executed by one or more execution nodes to generate a second result.

Generally, a traditional data platform can process a query plan by maintaining a schedule mechanism (e.g., global schedule), which comprises a dependency map that describes one or more execution dependencies between operators in the query map, and comprises a queue (e.g., ready queue) for operators (e.g., from the query plan) that are ready to be executed by execution nodes of the data platform (e.g., operators that have all their dependencies met). During operation, all the execution nodes of the data platform can be reserved and used for successive processing of individual operators from the queue. For instance, a single execution node of the data platform (e.g., a primary execution node) can select an individual operator from the queue (e.g., top of the queue), can reserve all execution nodes of the data platform to execute the individual operator, and can use (e.g., instruct) one or more of the execution nodes to execute different portions of the individual operator. After the individual operator completes execution (e.g., the one or more execution nodes report completion of execution of their respective portion), the single execution node can select the next operator from the queue, and repeat the process with respect to the next operator. As a result, only one operator of a query plan is globally scheduled at a time to be executed by the execution nodes of the data platform. This can be referred to as "lockstep" scheduling of individual operators using all the execution nodes of the data platform.

Unfortunately, this type of scheduling can result in stalls (e.g., execution node stalls), where during execution of an individual operator, one or more execution nodes reserved for executing the individual operator can sit idle waiting for all non-idle execution nodes to complete their respective portion of the execution (after which a next operator from the queue would be processed in a similar manner). Additionally, this can be particularly problematic where execution operations of a query plan involve small data sets. Take for instance where a query plan identifies a root (or top-level) operator, such as a join or union all operator, where the identified root operator is associated with a plurality of lower-level operators (or child operators), where the plurality of child operators includes a set (e.g., fragment or portion) of operators (hereafter, a query sub-plan or sub-plan) that involve scanning (e.g., table scanning) ten files, and where the data platform comprises twenty execution nodes. When all twenty execution nodes are used to execute the sub-plan, it is likely only some of the twenty execution nodes (e.g., ten of the twenty execution nodes) can be used to execute a scan (e.g., table scan) of the ten files (e.g., one file per execution node) while remaining execution nodes sit idle. This results in poor utilization of execution nodes, especially where multiple such sub-plans are queued to be processed.

Aspects of the present disclosure provide techniques for executing sub-plans in parallel using a plurality of execution nodes (e.g., of a data platform). In particular, various embodiments identify sub-plans (e.g., fragments or portions of one or more child operators) of a root operator in a query plan such that the identified sub-plans that are candidates for execution on a single execution node, determine a cost estimate for causing the candidate sub-plans to be executed in parallel using multiple execution nodes and cause the candidate sub-plans to be executed in parallel based on the cost estimate. According to various embodiments, each individual sub-plan comprises one or more child operators to be executed on a data set (e.g., table scans of a set of files). An individual sub-plan can represent a portion or fragment of a query plan that is associated with executing an operator identified in the query plan. For some embodiments, an individual sub-plan is considered a candidate for being executed on one execution node (e.g., is a single worker fragment) if the individual sub-plan is being executed on a data set that is smaller than a threshold value (e.g., table scans of less than 15 files and below a maximum table row number of 100,000). Each candidate sub-plan can represent an inexpensive plan fragment (e.g., comprising child operators of a root operator) that is likely inefficient to execute using multiple execution nodes (e.g., inefficient because there is too little work to distribute portions of the identified sub-plan to multiple execution nodes) but can be efficiently executed on a single execution node. In this way, various embodiments can enable candidate sub-plans to execute in parallel to each other, which can help avoid resource stalls caused by processing of small data sets in a larger query plan (e.g., a query plan involving a union all operator, where small data sets can be processed in parallel). For instance, an embodiment can enable inter-operator parallelism when executing operators of a query plan by a plurality of execution nodes. Example operators (e.g., root operators) having child operators that can benefit from the parallelism described herein include, without limitation, a union all operator and a join operator. Examples of child operators can include, without limitation, a table scan operator (e.g., of a file), an aggregate operator, and a hashjoin (e.g., hashjoin-build or hashjoinprobe) operator. The use of various embodiments can result in higher utilization of execution nodes (e.g., of a data platform).

For various embodiments, one or more candidate sub-plans are identified from a query plan, where each candidate sub-plan is a candidate for being executed on a single execution node. According to some embodiments, a single candidate sub-plan is identified (from the query plan) by analyzing (e.g., examining) how much data is to be processed by the single candidate sub-plan and determining whether the amount of data being processed is less than a threshold value. For instance, a single candidate sub-plan can be identified by determining whether one or more table scans of the single candidate sub-plan involve processing a certain number of files that is less than a threshold value (e.g., which can be regarded as a small or inexpensive set of files). Estimating how much data a single candidate sub-plan is processing can be based on how much data a table scan of the single candidate sub-plan is processing (e.g., a number of files or file count to be processed by the table scan), where all downstream operators in the single candidate sub-plan with a single input does not alter the amount of data being processed until a downstream operator with multiple inputs is reached (at which time the amounts are added together). For a multi-input operator in a sub-plan, a simplistic worst-case calculation can be made (e.g., for joins, the data estimate is the product of the two input costs). The resulting data estimate can be compared against the threshold value. A sub-plan is no longer a candidate when adding a downstream operator would result in exceeding the threshold value or if the downstream operator has multiple outputs.

During processing of a query plan, various embodiments decide whether one or more candidate sub-plans will be executed by individual execution nodes in parallel, or candidate sub-plans will be successively executed using all execution nodes on a single sub-plan at a time. For some embodiments, from a plurality of candidate sub-plans, a sub-plurality (e.g., batch) of candidate sub-plans having a similar set of dependencies is identified and processed by a cost function (e.g., based on a cost model) that determines two or more costs. For instance, the cost function can determine (e.g., estimate) for a sub-plurality of sub-plans: (1) a first cost of globally scheduling successive execution of each sub-plan in the sub-plurality of sub-plans, one at a time, using all execution nodes; and (2) a second cost of distributing individual sub-plans in the sub-plurality of sub-plans executing on individual execution nodes to facilitate parallel execution of sub-plans. The first cost can represent the cost for not using parallel execution of individual sub-plans of the sub-plurality of sub-plans, while the second cost can present the cost for using parallel execution of individual sub-plans of the sub-plurality of sub-plans. The first cost can be determined (e.g., estimated) by summing costs of executing individual fragments sub-plans, simulating sequential execution by all execution nodes, divided by a number of all execution nodes. The second cost can be determined (e.g., estimated) by simulating execution of individual sub-plans of the sub-plurality of sub-plans by: distributing the individual sub-plans to individual execution nodes, where the individual sub-plans are distributed in manner that minimize the overall cost (e.g., each next sub-plan is distributed/assigned/added to a current schedule queue of the execution node with the lowest load); and determining a maximum cost of all execution node workloads. The two costs can be compared and if the second cost is less than the first cost (or the second cost is less than a certain ratio of the first cost or less by a certain threshold), then individual sub-plans of the sub-plurality of sub-plans can be distributed to individual execution nodes for execution of two or more individual sub-plan in parallel. If the second cost is more than the first cost (or the second cost is greater than a certain ratio of the first cost or greater by a certain threshold), then individual sub-plans of the sub-plurality of sub-plans can be scheduled for successive execution of each sub-plan in the sub-plurality of sub-plans, one at a time, using all execution nodes. The ratio (or certain threshold used) in the comparison of costs can be adjusted to fine tune performance and processing of a query plan using execution nodes. By using a ratio or certain threshold as part of the cost comparison, various embodiments can err on the side of caution by processing sub-plans not using parallelism (rather than using parallelism), which may result in performance regression but can avoid an incorrect decision that may result in a high performance impact.

For various embodiments, a data platform maintains a global schedule comprising a dependency map and a queue of operators (e.g., root operators) ready to be executed (e.g., root operators that have all their dependencies met). The root operators in the (global schedule) queue can be populated based on a query plan currently scheduled for processing. During a normal mode of executing sub-plans, an embodiment can select an operator from the queue to execute and can cause all the execution nodes to execute one or more sub-plans associated with the selected root operator. For instance, a primary execution node of the data platform can select a root operator that is next in the queue, and can instruct multiple execution nodes (e.g., all execution nodes or all other execution nodes) of a data platform to execute a first individual sub-plan associated with the selected root operator such that all the execution nodes are reserved and potentially used with executing different portions of the first individual sub-plan. After the first individual sub-plan is completed, the primary execution node can instruct all the execution nodes to execute a next (second) individual sub-plan associated with the selected root operator such that all the execution nodes are reserved and potentially used with executing different portions of the second individual sub-plan. As a result, during normal mode of executing sub-plans, only one sub-plan is ever globally scheduled at a time for execution by all the execution nodes.

An operator (e.g., root operator) identified in the global schedule queue can represent one or more individual sub-plans, each of which can be a candidate for execution in parallel with one or more other individual sub-plans. Additionally, any operator outside of an individual sub-plan that depends on the individual sub-plan can be considered dependent on the operator.

When a root operator selected from the global schedule is associated with one or more sub-plans that are identified as candidates for execution in parallel, the primary execution node can determine whether to switch to a parallel mode of executing sub-plans. Additionally, when a root operator selected from the global schedule is associated with one or more candidate sub-plans for parallel execution, the primary execution node can identify all other candidate sub-plans for other root operators in the global schedule queue and form a sub-plan batch (e.g., single worker fragment batch) that comprises a plurality of candidate sub-plans for execution in parallel using multiple execution nodes. Depending on the embodiment, the primary execution node can process the sub-plan batch by a first cost function for successive execution of individual sub-plans using all execution nodes to generate a first cost (e.g., a cost of executing under normal mode), and can process the sub-plan batch by a second cost function for parallel execution individual sub-plans using multiple execution nodes to generate a second cost (e.g., cost of executing under parallel mode). The first and second costs can be compared and based on the comparison, the primary execution node can determine whether to execute the sub-plan batch using normal mode or parallel mode. Alternatively, prior to execution of a query, a compiler (e.g., a query compiler) can process the sub-plan batch by a first cost function (for successive execution of individual sub-plans using all execution nodes) to generate a first cost, can process the sub-plan batch by a second cost function for parallel execution individual sub-plans using multiple execution nodes to generate a second cost, can compare the first and the second costs, and can determine parallel execution or sequential execution based on the comparison.

Where it is determined that the sub-plan batch is to be executed using parallel mode, the primary execution node can distribute individual sub-plans from the sub-plan batch to available execution nodes (e.g., primary execution node requests or assigns execution of one or more individual sub-plans from the sub-plan batch by an individual execution node). Each execution node can execute one sub-plan at a time. Where multiple sub-plans are distributed to an individual execution node, the individual execution node can queue the sub-plans for successive execution. After all the execution nodes being used to execute the sub-plan batch in parallel report completion, the primary execution node can revert back to operating in normal mode using the global schedule (until an opportunity to use parallel mode on another sub-plan batch is encountered). In this way, various embodiments can interleave use of normal and parallel modes of executing sub-plans as appropriate.

To support single sub-plan execution by an individual execution node (and facilitate parallel execution of sub-plans), each execution node can have a current schedule (e.g., current, local, or single worker fragment schedule queue). For instance, each execution node of a data platform can maintain its own current schedule or the data platform can maintain the current schedules for the individual execution nodes. Additionally, the data platform can access the current schedules of individual execution nodes to enable distribution of individual sub-plans to individual execution nodes based on their respective workloads (e.g., to facilitate distribution in a low-cost manner).

For some embodiments, using a parallel mode of sub-plan execution rather than a normal mode of sub-plan execution (e.g., successive execution) can reduce scheduling overhead. In particular, during parallel mode of executing sub-plans, a single scheduling operation can be performed to assign an individual sub-plan to an individual execution node. In comparison, during successive mode of executing sub-plans, multiple scheduling operations may be performed per an individual sub-plan as each individual sub-plan is assigned to each execution node (e.g., each execution node works on the same individual sub-plan, with different portions being assigned to different execution nodes).

As used herein, an execution node can comprise a worker, a thread, a computing device or entity (e.g., server), a processor, or the like. Two or more execution nodes can communicate with each other. A sub-plan can be associated with an operator (e.g., root operator identified in a query plan, such as a join or union all operator) and can comprise one or more child operators performed for the operator. An individual sub-plan can represent a portion or fragment of a query plan that is associated with executing an operator identified in the query plan. A single worker fragment can refer to a sub-plan comprising one or more operators to be executed on a small data set (e.g., scanning less files than a threshold value). For various embodiments, a single worker fragment is a candidate sub-plan for execution using a single execution node (rather than using two or more execution nodes). Accordingly, multiple single worker fragments can be executed in parallel. A single worker fragment can be rooted in a single root operator and end in plan leaves, such as table scans of files or table data.

In the present disclosure, "files" refer to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location."

Computer-readable files come in several varieties, including unstructured files, semi-structured files, and structured files. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

The various embodiments that are described herein are described with reference where appropriate to one or more of the various figures.

FIG. 1 illustrates an example computing environment 100 that includes a database system in the example form of a network-based database system 102, in accordance with some embodiments of the present disclosure. For some embodiments, the network-based database system 102 implements part of data platform configured for parallel execution of sub-plans using multiple execution nodes as described herein. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to as herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, a users account object of the users account object type lists users authorized to access at least one target account (e.g., an account of a data provider or data consumer 115). In some embodiments, a roles account object of the roles account object type configures privileges for the users to access the at least one target account. In some aspects, a warehouse object of the warehouse object type indicates compute resources (e.g., at least one virtual warehouse of the execution platform 110) for executing a workload associated with one or more databases of the data provider. In some embodiments, a resource monitor object of the resource monitor object type configures monitoring usage of the compute resources.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
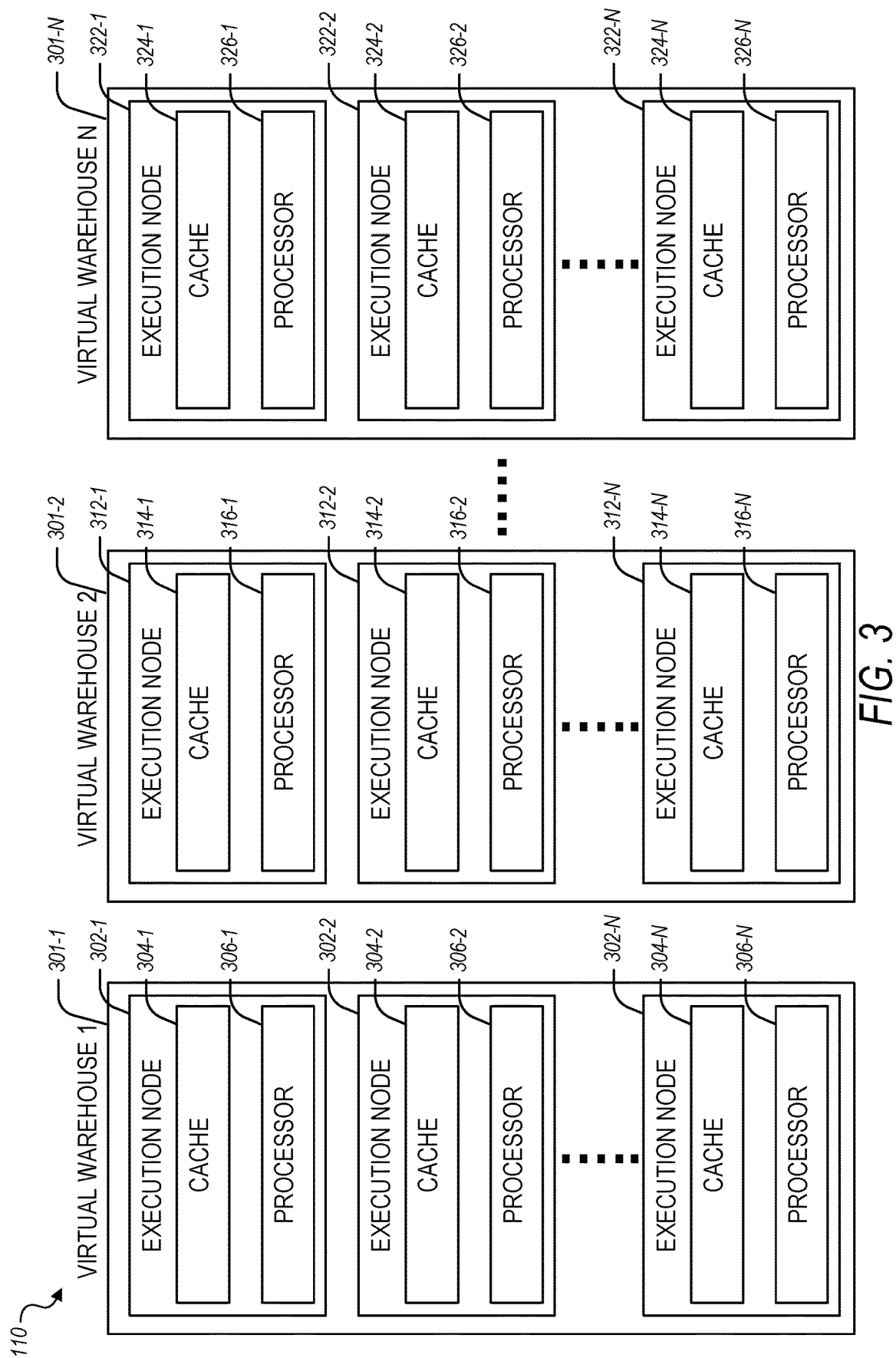
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a parallel sub-plan executor 132. The parallel sub-plan executor 132 comprises suitable circuitry, interfaces, logic, and/or code and is configured to perform the disclosed functionalities associated with parallel execution of sub-plans on multiple execution nodes of the execution platform 110. For instance, the parallel sub-plan executor 132 can access a query plan comprising a root operator (e.g., join or union all operator) associated with a plurality of sub-plans for executing the root operator, where each sub-plan in the plurality of sub-plans comprises a set of child operators. The parallel sub-plan executor 132 can identify, from the plurality of sub-plans, a sub-plurality (e.g., a batch) of sub-plans that each involve processing a data set that satisfies a set of criteria (e.g., which determines that small data set is small, such as criteria that the data set comprises 15 or less files and/or 100,000 or less table rows). The parallel sub-plan executor 132 can estimate a first cost for executing individual sub-plans, of the sub-plurality (e.g., batch) of sub-plans, successively such that all execution nodes of the execution platform 110 are reserved for execution of an individual sub-plan until the individual sub-plan completes execution. The first cost can represent a cost of executing sub-plans in normal mode. The parallel sub-plan executor 132 can estimate a second cost for executing the sub-plurality (e.g., batch) of sub-plans in parallel using the plurality of execution nodes such that at least two sub-plans of the sub-plurality of sub-plans are executed in parallel using the plurality of execution nodes. The second cost can represent a cost of executing two or more sub-plans in parallel mode.

The parallel sub-plan executor 132 can compare the first cost to the second cost and determine, based on the comparison, whether the sub-plurality of sub-plans is to be executed in parallel using the plurality of execution nodes. For instance, in response to determining that the first cost is greater than the second cost, the parallel sub-plan executor 132 can determine to execute the sub-plurality (e.g., batch) of sub-plans in parallel. In an alternative instance, in response to determining that the first cost is at least greater than the second cost by a threshold value (e.g., a ratio of the first cost), the parallel sub-plan executor 132 can determine to execute the sub-plurality of sub-plans in parallel. Where the parallel sub-plan executor 132 determines to execute the sub-plurality of sub-plans in parallel, the parallel sub-plan executor 132 can cause the sub-plurality of sub-plans to be executed in parallel using the plurality of execution nodes. However, in response to determining that the sub-plurality of sub-plans is to not be executed in parallel using the plurality of execution nodes, the parallel sub-plan executor 132 can cause the individual sub-plans of the sub-plurality of sub-plans to be executed successively. Additional functionalities associated with parallel execution of sub-plans on multiple execution nodes are discussed in connection with FIG. 4-FIG. 8.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs (e.g., operators of sub-plans) determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
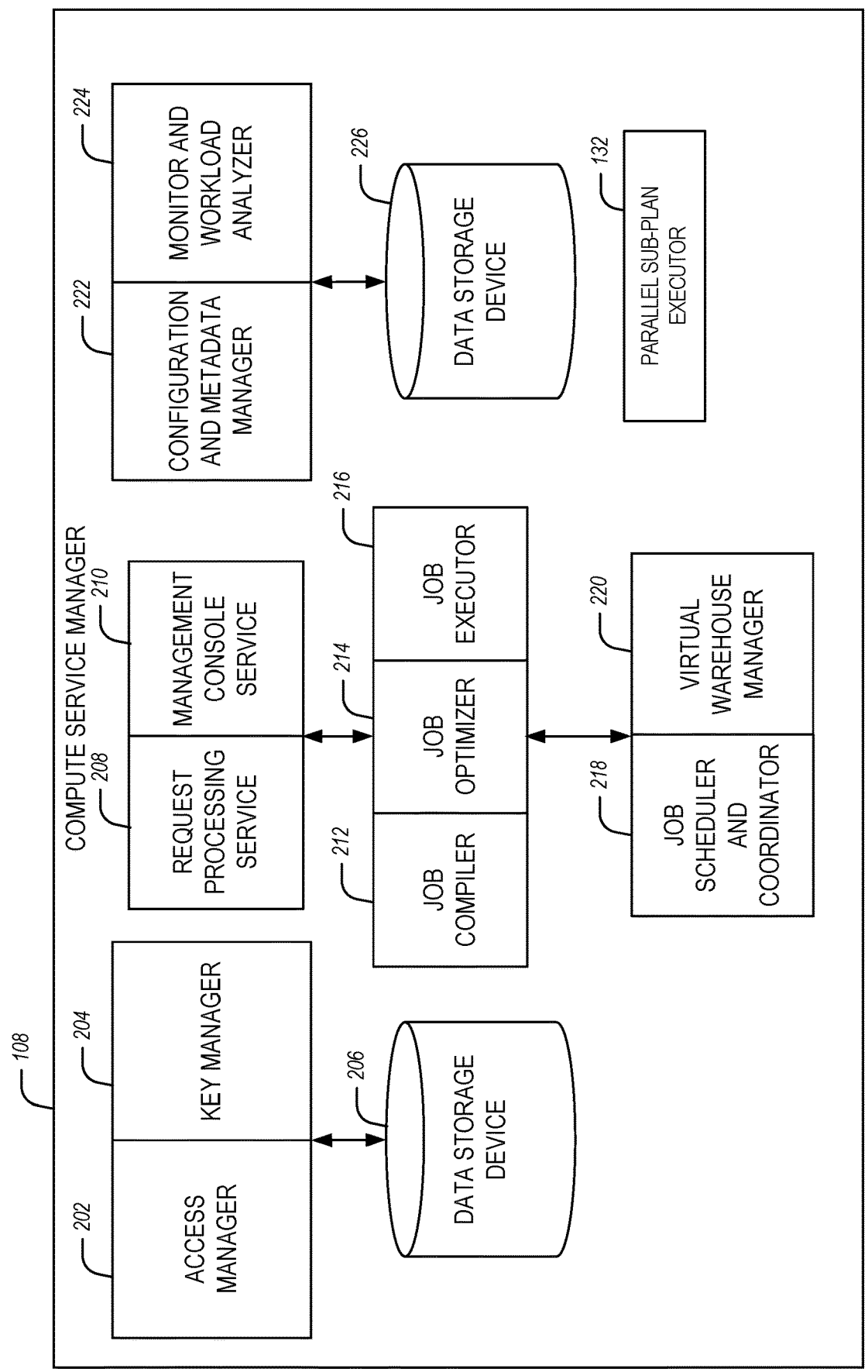
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the parallel sub-plan executor 132 configured to perform the disclosed functionalities associated with parallel execution of sub-plans on multiple execution nodes.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

According to various embodiments, the parallel sub-plan executor 132 uses one or more of the execution nodes of execution platform 110 (e.g., execution node 302-1) to either execute multiple sub-plans in parallel or execute individual sub-plans successively by reserving all available execution nodes for execution for each individual sub-plan. In some embodiments, at least one of the execution nodes of execution platform 110 (e.g., execution node 302-1) can be configured with the parallel sub-plan executor 132.

Figure 4:
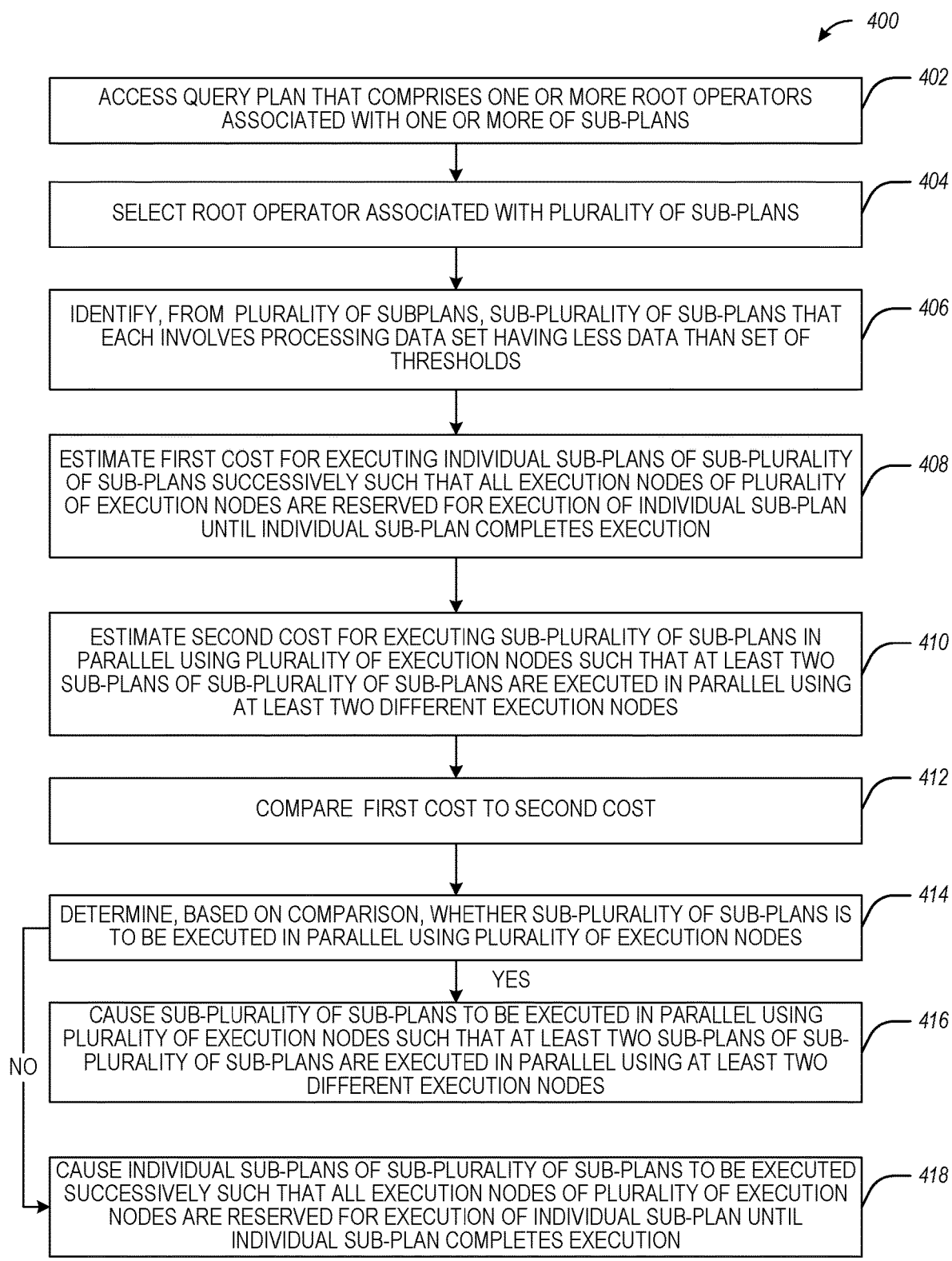
FIG. 4 is a flow diagram illustrating operations of a data platform in performing a method for parallel execution of sub-plans using multiple execution nodes, in accordance with some embodiments of the present disclosure.

FIG. 4 is a flow diagram illustrating operations of a data platform in performing a method 400 for parallel execution of sub-plans using multiple execution nodes, in accordance with some embodiments of the present disclosure. Method 400 may be embodied in computer-readable instructions for execution by one or more hardware components (e.g., one or more processors) such that the operations of the method 400 may be performed by components of the network-based database system 102, such as a network node (e.g., parallel sub-plan executor 132 executing on a network node of the compute service manager 108) or computing device which may be implemented as machine 9 of FIG. 9 and may be configured with an application connector performing the disclosed functions. Accordingly, method 400 is described below, by way of example with reference thereto. However, it shall be appreciated that method 400 may be deployed on various other hardware configurations and is not intended to be limited to deployment within the network-based database system 102.

At operation 402, a hardware processor accesses a query plan that comprises one or more operators (e.g., root or parent operators), where at least one operator (e.g., at least one root or parent operator) is associated with a plurality of sub-plans, and where each sub-plan in plurality of sub-plans comprises a set of child operators. The query plan accessed can be one currently scheduled to be processed by a data platform. As noted herein, each sub-plan can represent a fragment or portion of the query plan that facilitates execution of at least one of the one or more operators. As also noted herein, the method 400 can eventually identify which (if any) of the sub-plans are candidate sub-plans (e.g., inexpensive fragments) that can be individually executed using individual execution nodes (rather using two or more execution nodes to execute different portions of an individual sub-plan). For some embodiments, the child operators of a sub-plan are determined from (e.g., identified by) the query plan accessed by operation 402.

Subsequently, at operation 404, the hardware processor selects at least one root operator (e.g., join or union all operator) from a global scheduling queue. For some embodiments, the global scheduling queue is populated with a plurality of root operators based on the query access plan accessed by operation 402. For instance, a single root operator that is next in the global scheduling queue can be selected as a current root operator to be executed.

At operation 406, the hardware processor identifies, from the plurality of sub-plans, a sub-plurality of sub-plans that each involves processing a data set that satisfies a set of criteria (e.g., a data set that represents a small or inexpensive data set to process). For some embodiments, the data set comprises one or more files (e.g., to be table scanned according to a sub-plan), which can describe one or more tables of a database system. Accordingly, the data set can comprise or represent one or more tables of a database system. For various embodiments, the set of criteria includes one or more criteria for identifying data sets that are capable of being executed (e.g., efficiently executed) by a single execution node (e.g., data set that is small or inexpensive to execute). The set of criteria can include, for example, a maximum data size of a file to be scanned according to a sub-plan, a maximum number of files (e.g., file count) to be scanned according to a sub-plan (e.g., 10 files or 15 files), a maximum number of table rows to be scanned according to a sub-plan, type of file to be processed according to a sub-plan, and the like. The set of criteria can generally include any criterion that assists in identifying a data set capable of efficient execution by a single execution node as described herein. The sub-plurality of sub-plans identified by operation 406 can represent a sub-plan batch that can be considered by the data platform for execution in parallel using the plurality of execution nodes. Additionally, for some embodiments, sub-plans in the sub-plurality of sub-plans identified by operation 406 have the same set of dependencies. The commonality of dependencies amongst sub-plans can be determined based on a dependency map maintained (e.g., by the data platform) for operators (e.g., in a global schedule queue) to be executed. The dependency map can be initialized based on the query plan accessed at operation 402 and updated as operators are executed.

According to some embodiments, operation 406 is performed as part of (or in response to) the selection of an operator (e.g., root operator) from a global schedule queue being used by the data platform to process a query plan. For instance, when an operator is selected from the global schedule queue, it can be determined whether any sub-plan associated with the operator involves processing a data set that satisfies a set of criteria, and those sub-plans that do can be included in (e.g., made a part of) the sub-plurality of sub-plans (e.g., sub-plan batch) identified by operation 406. Additionally, if any sub-plan associated with the operator is determined to satisfy the set of criteria, it can be determined whether any other sub-plans associated with other operators in the global schedule queue satisfy the set of criteria, and those sub-plans that do can be included in (e.g., made a part of) the sub-plurality of sub-plans (e.g., sub-plan batch).

Eventually, at operation 408, the hardware processor estimates a first cost for executing individual sub-plans of the sub-plurality of sub-plans successively such that all execution nodes of a plurality of execution nodes are reserved for execution of an individual sub-plan until the individual sub-plan completes execution. The first cost can represent a cost of globally scheduling the sub-plurality of sub-plans using all the plurality of execution nodes (e.g., using a normal mode of executing sub-plans). Depending on the embodiment, the first cost can comprise the sum of the costs of individual sub-plans, simulating successive execution, divided by the number of execution nodes in the plurality of execution nodes.

Additionally, at operation 410, the hardware processor estimates a second cost for executing the sub-plurality of sub-plans in parallel using the plurality of execution nodes such that at least two sub-plans of the sub-plurality of sub-plans are executed in parallel using at least two different execution nodes. The second cost can represent a cost of processing candidate sub-plans (e.g., single worker fragments) in parallel using two or more execution nodes of the plurality of execution nodes. Depending on the embodiment, the second cost can be computed by: simulating distribution (e.g., assignment) of individual candidate sub-plans to available execution nodes of the plurality of execution nodes to facilitate parallel execution while trying to minimize cost (e.g., each next candidate sub-plan gets distributed to the available execution node with the lowest workload); and determining the second cost as the maximum cost of all workloads executed by the execution nodes being used.

At operation 412, the hardware processor compares the first cost (e.g., for normal mode of execution) determined by operation 408 to the second cost (e.g., for parallel mode of execution) determined by operation 410. Subsequently, at operation 414, the hardware processor determined, based on the comparison of operation 412, whether the sub-plurality of sub-plans is to be executed in parallel using the plurality of execution nodes. For some embodiments, operation 412 comprises determining whether the first cost is greater than the second cost and, in response to determining that the first cost is greater than the second cost, the hardware processor determines to execute the sub-plurality of sub-plans in parallel using the plurality of execution nodes. In some alternative embodiments, operation 412 comprises determining whether the first cost is at least greater than the second cost by a threshold value and, in response to determining that the first cost is at least greater than the second cost by the threshold value, the hardware processor determines to execute the sub-plurality of sub-plans in parallel using the plurality of execution nodes. Depending on the embodiment, the threshold value comprises a value determined by computing a ratio of the first cost, such as one-half or one-third of the first cost.

In response to determining that the sub-plurality of sub-plans is to be executed in parallel using the plurality of execution nodes, the method 400 continues to operation 416, where the hardware processor causes the sub-plurality of sub-plans to be executed in parallel using the plurality of execution nodes such that at least two sub-plans of the sub-plurality of sub-plans are executed in parallel using at least two different execution nodes. For some embodiments, operation 416 comprises performing a single scheduling operation, for each single sub-plan in the sub-plurality of sub-plans, to assign execution of the single sub-plan to a single execution node of the plurality of execution nodes. In particular, the single schedule operation can comprise adding the single sub-plan to a current scheduling queue of the single execution node. Additionally, the single execution node can be configured to generate a local schedule queue to process the single sub-plan assigned to the single execution node.

In response to determining that the sub-plurality of sub-plans is to be executed in parallel using the plurality of execution nodes, the method 400 continues to operation 418, where the hardware processor causes the individual sub-plans of the sub-plurality of sub-plans to be executed successively such that all execution nodes of the plurality of execution nodes are reserved for execution of the individual sub-plan until the individual sub-plan completes execution. For various embodiments, successive execution comprises successively scheduling the individual sub-plans of the sub-plurality of sub-plans to be executed using all execution nodes of the plurality of execution nodes, where a next sub-plan of the sub-plurality of sub-plans is not scheduled until a last sub-plan of the sub-plurality of sub-plans has completed execution. Additionally, the successively scheduling can comprise performing a separate scheduling operation for each execution node of the plurality of execution nodes to be used to execute a portion of a current sub-plan. As noted herein, this can result in more schedule operations being performed compared to when sub-plans are scheduled for execution in parallel in accordance with an embodiment.

Figure 5:
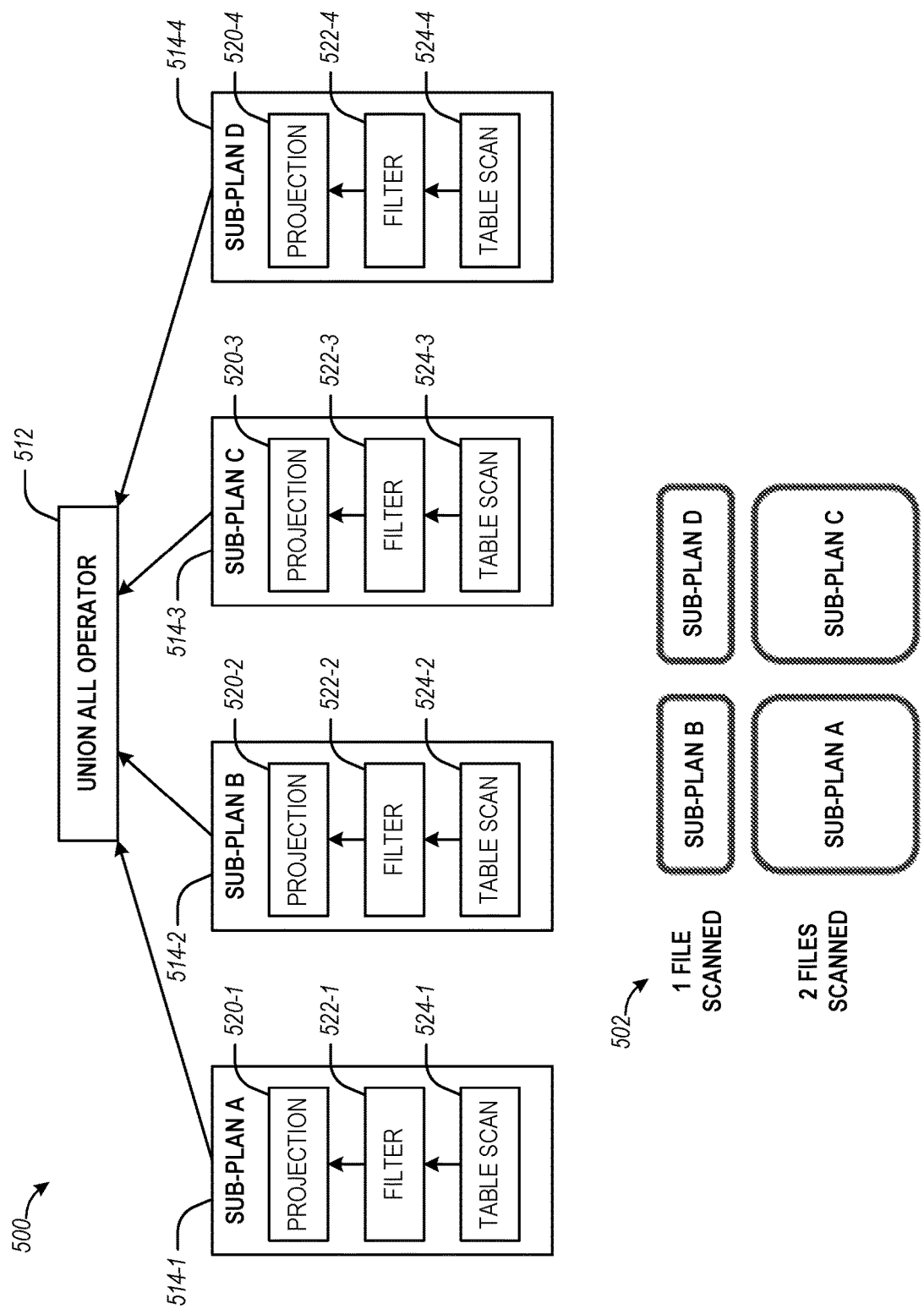
FIG. 5 presents a graphical representation of an example operator and its associated sub-plans, which can be executed successively or in parallel, in accordance with some embodiments of the present disclosure.

FIG. 5 presents a graphical representation 500 of an example operator and its associated sub-plans, which can be executed successively or in parallel in accordance with some embodiments of the present disclosure. In particular, FIG. 5 illustrates a union all operator 512 having associated sub-plans A, B, C, and D (hereafter, sub-plans 514-1, 514-2, 514-3, and 514-4 respectively). As shown, each sub-plan 514 (514-1, 514-2, 514-3, 514-4) comprises the following child operators: a table scan operator 524 (524-1, 524-2, 524-3, 524-4 respectively) that scans a data set (e.g., each scans a different set of files describing aspects of one or more database tables); a filter operator 522 (522-1, 522-2, 522-3, 522-4 respectively) that is applied to the result of the table scan operator 524; and a projection operator 520 (520-1, 520-2, 520-3, 520-4 respectively) that is applied to the output of the filter operator 522. According to various embodiments, the sub-plans 514-1, 514-2, 514-3, 514-4 and their respective child operators are determined (e.g., described) by a query plan that identified the union all operator 512 for execution. Eventually, the union all operator 512 receives the output of each projection operator 520 (520-1, 520-2, 520-3, 520-4) and applies a union all operator on the received outputs. As also shown (502), each of the sub-plans B and D (514-2 and 514-4 respectively) involve processing (e.g., table scanning) of one file, while each of the sub-plans A and C (514-1 and 514-3 respectively) involve processing (e.g., table scanning) of two files. According to various embodiments, the sub-plans 514-1, 514-2, 514-3, 514-4 can be considered candidate sub-plans for execution in parallel if the sub-plans 514-1, 514-2, 514-3, 514-4 share the same set of dependencies, and each of the sub-plans 514-1, 514-2, 514-3, 514-4 processes a data set that satisfies a set of criteria (e.g., criterion identified a maximum number of scanned files) used to determine whether a sub-plan is suitable for execution by a single execution node. For instance, where the sub-plans 514-1, 514-2, 514-3, 514-4 share the same set of dependencies, each of the sub-plans 514-1, 514-2, 514-3, 514-4 would be regarded a candidate sub-plan if the set of criteria only had a single criteria that the maximum number files to be scanned is five files.

Figure 6:
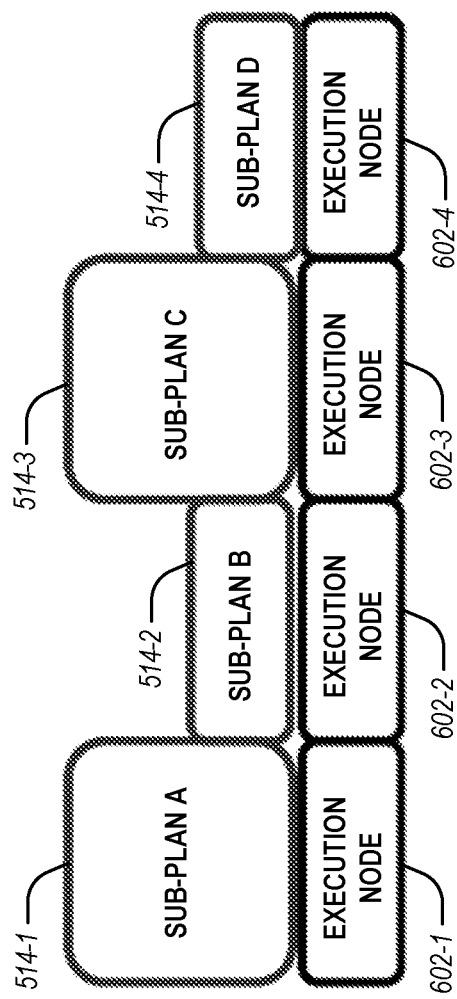
FIG. 6 and FIG. 7 illustrate example distributions of sub-plans for parallel execution using multiple execution nodes, in accordance with some embodiments of the present disclosure.

FIG. 6 illustrates an example distribution of the sub-plans 514-1, 514-2, 514-3, 514-4 of FIG. 5 for parallel execution using four execution nodes 602-1, 602-2, 602-3, 602-4, in accordance with some embodiments of the present disclosure. According to various embodiments, the sub-plans 514-1, 514-2, 514-3, 514-4 are distributed to the execution nodes 602-1, 602-2, 602-3, 602-4 for parallel execution after each of the sub-plans 514-1, 514-2, 514-3, 514-4 is identified as a candidate for execution on a single execution node, and after it is determined that parallel execution of the sub-plans 514-1, 514-2, 514-3, 514-4 should occur based on a cost analysis (e.g., comparison of costs between successive and parallel execution as described herein). As shown, the sub-plan 514-1 is assigned to execution node 602-1 for execution, the sub-plan 514-2 is assigned to execution node 602-2 for execution, the sub-plan 514-3 is assigned to execution node 602-3 for execution, and the sub-plan 514-4 is assigned to execution node 602-4 for execution. According to various embodiments, distribution of sub-plans to individual execution nodes is based on the workload of those individual execution nodes. For instance, the sub-plans can be successively assigned to individual execution nodes such that each sub-plan is assigned to the individual execution node that currently has the lowest workload (e.g., currently having the least number of files to scan).

Figure 7:
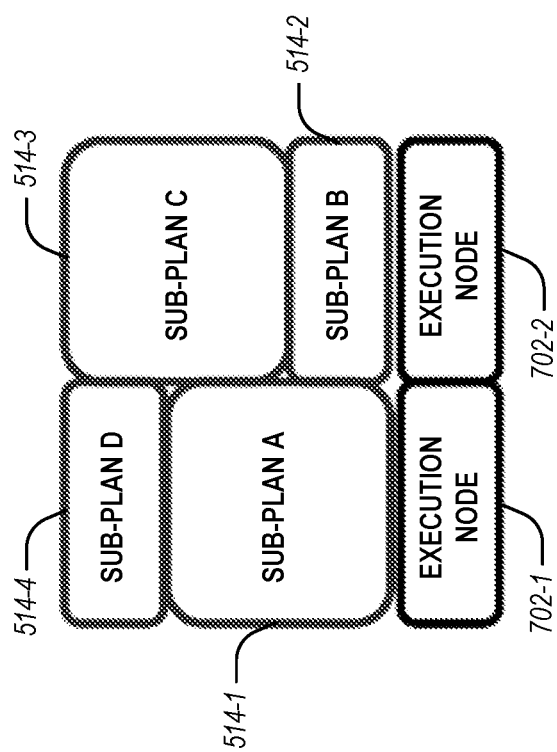

Like FIG. 6, FIG. 7 illustrates an example distribution of the sub-plans 514-1, 514-2, 514-3, 514-4 of FIG. 5 for parallel execution, in accordance with some embodiments of the present disclosure, but using two execution nodes 702-1, 702-2 rather than four execution nodes. FIG. 7 also illustrates how the sub-plans 514-1, 514-2, 514-3, 514-4 can be distributed to the execution nodes 702-1, 702-2 such that each sub-plan is assigned to the individual execution node that currently has the lowest workload. For instance, assume that initially that none of the execution nodes 702-1, 702-2 have a workload when the sub-plans 514-1, 514-2, 514-3, 514-4 begin to be successively assigned for execution. As illustrated, the successive assignment of the sub-plans 514-1, 514-2, 514-3, 514-4 leads to the sub-plan 514-1 (having two files to scan) first being assigned to the execution node 702-1, the sub-plan 514-2 (having one file to scan) being assigned next to the execution node 702-2 because it has the lowest workload at the time (after the assignment of the sub-plan 514-1), the sub-plan 514-3 (having two files to scan) being assigned next to the execution node 702-2 because it continues to have the lowest workload at the time (after the assignment of the sub-plans 514-1, 514-2), and finally the sub-plan 514-4 (having one file to scan) being assigned next to the execution node 702-1 because it has the lowest workload at the time (after the assignment of the sub-plans 514-1, 514-2, 514-3).

Figure 8:
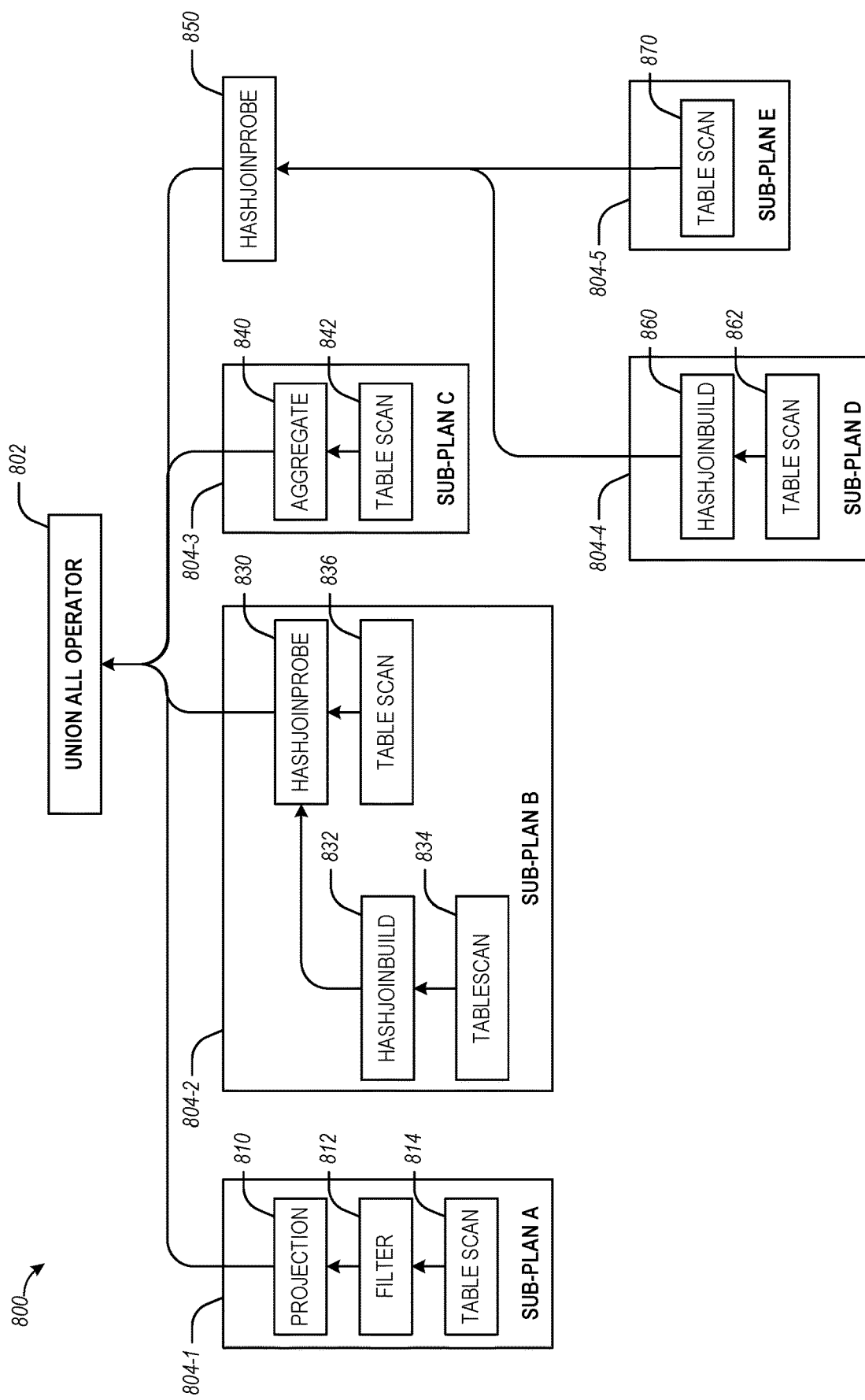
FIG. 8 illustrates a graphical representation of an example operator and its associated sub-plans, which can be executed successively or in parallel, in accordance with some embodiments of the present disclosure.

FIG. 8 illustrates a graphical representation 800 of an example operator and its associated sub-plans, which can be executed successively or in parallel in accordance with some embodiments of the present disclosure. In particular, FIG. 8 illustrates a union all operator 802 having associated sub-plans A, B, C, D, and E (hereafter, sub-plans 804-1, 804-2, 804-3, 804-4, and 804-5 respectively). According to various embodiments, the sub-plans 804-1, 804-2, 804-3, 804-4, 804-5 and their respective child operators are determined (e.g., described) by a query plan that identifies the union all operator 802 for execution. As shown, the sub-plan 804-1 comprises a table scan operator 814 that scans a data set, a filter operator 812 that is applied to the result of the table scan operator 814, and a projection operator 810 that is applied to the output of the filter operator 812.

The sub-plan 804-2 comprises a table scan operator 834 that scans a data set, a hashjoinbuild operator 832 that operates on a result of the table scan operator 834, a table scan operator 836 that scans another data set, and a hashjoinprobe operator 830 that operates on the results of the hashjoinbuild operator 832 and the table scan operator 836. The sub-plan 804-3 comprises a table scan operator 842 that scans a data set, and an aggregate operator 840 applied to a result of the table scan operator 842. The sub-plan 804-4 comprises a table scan operator 862 that scans a data set, and a hashjoinbuild operator 860 that operates on a result of the table scan operator 862. The sub-plan 804-5 comprises a table scan operator 870 that scans a data set. A hashjoinprobe operator 850, which is not part of any sub-plan, operates on the output of the hashjoinbuild operator 860 and the result of the table scan operator 870. Eventually, the union all operator 802 receives the output of the projection operator 810, the output of the hashjoinprobe operator 830, the output of the aggregate operator 840, and the output of the hashjoinprobe operator 850 and applies a union all operator on the received outputs.

Figure 9:
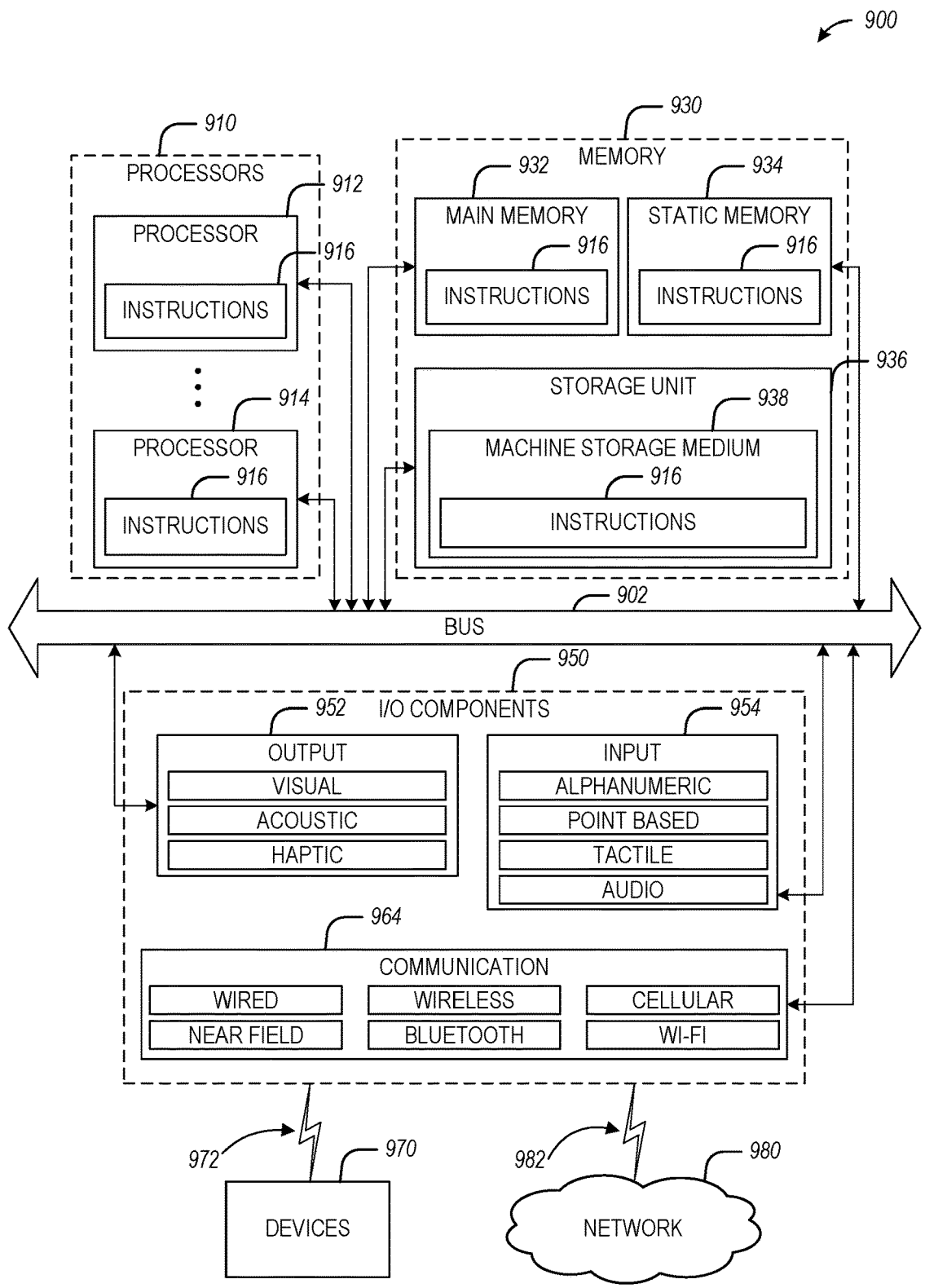
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, instructions 916 may cause machine 900 to execute any one or more operations of method 400 (or any other technique discussed herein, for example in connection with FIG. 4-FIG. 8). As another example, instructions 916 may cause machine 900 to implement one or more portions of the functionalities discussed herein. In this way, instructions 916 may transform a general, non-programmed machine into a particular machine 900 (e.g., the client device 114, the compute service manager 108, or a node in the execution platform 110) that is specially configured to carry out any one of the described and illustrated functions in the manner described herein. In yet another embodiment, instructions 916 may configure the client device 114, the compute service manager 108, and/or a node in the execution platform 110 to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

Machine 900 includes processors 910, memory 930, and input/output (I/O) components 950 configured to communicate with each other such as via a bus 902. In some example embodiments, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute ins tructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The device 970 may be another machine or any of a wide variety of peripheral devices (e.g., a peripheral device coupled via a universal serial bus (USB)). For example, as noted above, machine 900 may correspond to any one of the client device 114, the compute service manager 108, or the execution platform 110, and the devices 970 may include the client device 114 or any other computing device described herein as being in communication with the network-based database system 102 or the cloud storage platform 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of several well-known transfer protocols (e.g., hypertext transfer protocol (HTTP)). Similarly, instructions 916 may be transmitted or received using a transmission medium via the coupling 972 (e.g., a peer-to-peer coupling or another type of wired or wireless network coupling) to the device 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 400 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system including: at least one hardware processor; and at least one memory storing instructions that cause the at least one hardware processor to perform operations including: accessing a query plan that includes at least one root operator, the at least one root operator being associated with a plurality of sub-plans; identifying, from the plurality of sub-plans, a sub-plurality of sub-plans that each involves processing a data set that satisfies a set of criteria; estimating a first cost for executing individual sub-plans of the sub-plurality of sub-plans successively using a plurality of execution nodes; estimating a second cost for executing the sub-plurality of sub-plans in parallel using the plurality of execution nodes; comparing the first cost to the second cost; determining, based on the comparing, whether the sub-plurality of sub-plans is to be executed in parallel using the plurality of execution nodes; and in response to determining that the sub-plurality of sub-plans is to be executed in parallel using the plurality of execution nodes, causing the sub-plurality of sub-plans to be executed in parallel using the plurality of execution nodes.

In Example 2, the subject matter of Example 1 includes subject matter where the determining, based on the comparing, whether the sub-plurality of sub-plans is to be executed in parallel using the plurality of execution nodes includes: based on the comparing, determining whether the first cost is greater than the second cost; and in response to determining that the first cost is greater than the second cost, determining to execute the sub-plurality of sub-plans in parallel using the plurality of execution nodes.

In Example 3, the subject matter of any one of Examples 1-2 includes subject matter where the determining, based on the comparing, whether the sub-plurality of sub-plans is to be executed in parallel using the plurality of execution nodes includes: based on the comparing, determining whether the first cost is at least greater than the second cost by a threshold value; and in response to determining that the first cost is at least greater than the second cost by the threshold value, determining to execute the sub-plurality of sub-plans in parallel using the plurality of execution nodes.

In Example 4, the subject matter of any one of Examples 1-3 includes subject matter where the threshold value includes a ratio of the first cost.

In Example 5, the subject matter of any one of Examples 1-4 includes subject matter where the operations include: in response to determining that the sub-plurality of sub-plans is to not be executed in parallel using the plurality of execution nodes, causing the individual sub-plans of the sub-plurality of sub-plans to be executed successively such that all execution nodes of the plurality of execution nodes are reserved for execution of the individual sub-plan until the individual sub-plan completes execution.

In Example 6, the subject matter of any one of Examples 1-5 includes subject matter where the causing of the individual sub-plans of the sub-plurality of sub-plans to be executed successively includes: successively scheduling the individual sub-plans of the sub-plurality of sub-plans to be executed using all execution nodes of the plurality of execution nodes, the individual sub-plans being successively scheduled such that a next sub-plan of the sub-plurality of sub-plans is not scheduled until a last sub-plan of the sub-plurality of sub-plans has completed execution.

In Example 7, the subject matter of any one of Examples 1-6 includes subject matter where the successively scheduling includes performing a separate scheduling operation for each execution node of the plurality of execution nodes to be used to execute a portion of a current sub-plan.

In Example 8, the subject matter of any one of Examples 1-7 includes subject matter where the causing of the sub-plurality of sub-plans to be executed in parallel using the plurality of execution nodes includes: for each single sub-plan in the sub-plurality of sub-plans, performing a single scheduling operation to assign execution of the single sub-plan to a single execution node of the plurality of execution nodes.

In Example 9, the subject matter of any one of Examples 1-8 includes subject matter where the single execution node is configured to generate a local schedule queue to process the single sub-plan assigned to the single execution node.

In Example 10, the subject matter of any one of Examples 1-9 includes subject matter where the single scheduling operation to assign execution of the single sub-plan to the single execution node includes: adding the single sub-plan to a current scheduling queue of the single execution node.

In Example 11, the subject matter of any one of Examples 1-10 includes subject matter where the data set includes one or more files.

In Example 12, the subject matter of any one of Examples 1-11 includes subject matter where the at least one root operator including a join operator.

In Example 13, the subject matter of any one of Examples 1-12 includes subject matter where the at least one root operator including a union all operator.

In Example 14, the subject matter of any one of Examples 1-13 includes subject matter where sub-plans in the sub-plurality of sub-plans have a same set of dependencies.

In Example 15, the subject matter of any one of Examples 1-14 includes subject matter where the operations include: maintaining a dependency map that describes one or more dependencies between individual operators to be executed, the dependency map being initialized based on the query plan, and the identifying the sub-plurality of sub-plans being based on the dependency map.

In Example 16, the subject matter of any one of Examples 1-15 includes subject matter where the operations include: selecting the at least one root operator from a global scheduling queue.

In Example 17, the subject matter of any one of Examples 1-16 includes subject matter where the set of criteria includes one or more criteria for identifying a data set that is capable of being executed by a single execution node.

Example 18 is a method including: accessing, by a hardware processor, a query plan that includes at least one root operator, the at least one root operator being associated with a plurality of sub-plans; identifying, by the hardware processor and from the plurality of sub-plans, a sub-plurality of sub-plans that each involves processing a data set that satisfies a set of criteria; estimating, by the hardware processor, a first cost for executing individual sub-plans of the sub-plurality of sub-plans successively using a plurality of execution nodes; estimating, by the hardware processor, a second cost for executing the sub-plurality of sub-plans in parallel using the plurality of execution nodes; comparing, by the hardware processor, the first cost to the second cost; determining, by the hardware processor and based on the comparing, that the sub-plurality of sub-plans is to be executed in parallel using the plurality of execution nodes; and in response to determining that the sub-plurality of sub-plans is to be executed in parallel using the plurality of execution nodes, causing, by the hardware processor, the sub-plurality of sub-plans to be executed in parallel using the plurality of execution nodes.

In Example 19, the subject matter of Example 18 includes subject matter where the determining, based on the comparing, whether the sub-plurality of sub-plans is to be executed in parallel using the plurality of execution nodes includes: based on the comparing, determining whether the first cost is greater than the second cost; and in response to determining that the first cost is greater than the second cost, determining to execute the sub-plurality of sub-plans in parallel.

In Example 20, the subject matter of any one of Examples 18-19 includes subject matter where the determining, based on the comparing, whether the sub-plurality of sub-plans is to be executed in parallel using the plurality of execution nodes includes: based on the comparing, determining whether the first cost is at least greater than the second cost by a threshold value; and in response to determining that the first cost is at least greater than the second cost by the threshold value, determining to execute the sub-plurality of sub-plans in parallel using the plurality of execution nodes.

In Example 21, the subject matter of any one of Examples 18-20 includes subject matter where the threshold value includes a ratio of the first cost.

In Example 22, the subject matter of any one of Examples 18-21 includes subject matter where the operations include: in response to determining that the sub-plurality of sub-plans is to not be executed in parallel using the plurality of execution nodes, causing the individual sub-plans of the sub-plurality of sub-plans to be executed successively such that all execution nodes of the plurality of execution nodes are reserved for execution of the individual sub-plan until the individual sub-plan completes execution.

In Example 23, the subject matter of any one of Examples 18-22 includes subject matter where wherein the causing of the individual sub-plans of the sub-plurality of sub-plans to be executed successively includes: successively scheduling the individual sub-plans of the sub-plurality of sub-plans to be executed using all execution nodes of the plurality of execution nodes, the individual sub-plans being successively scheduled such that a next sub-plan of the sub-plurality of sub-plans is not scheduled until a last sub-plan of the sub-plurality of sub-plans has completed execution.

In Example 24, the subject matter of any one of Examples 18-23 includes subject matter where the successively scheduling includes performing a separate scheduling operation for each execution node of the plurality of execution nodes to be used to execute a portion of a current sub-plan.

In Example 25, the subject matter of any one of Examples 18-24 includes subject matter where the causing of the sub-plurality of sub-plans to be executed in parallel using the plurality of execution nodes includes: for each single sub-plan in the sub-plurality of sub-plans, performing a single scheduling operation to assign execution of the single sub-plan to a single execution node of the plurality of execution nodes.

In Example 26, the subject matter of any one of Examples 18-25 includes subject matter where the single execution node is configured to generate a local schedule queue to process the single sub-plan assigned to the single execution node.

In Example 27, the subject matter of any one of Examples 18-26 includes subject matter where the single scheduling operation to assign execution of the single sub-plan to the single execution node includes: adding the single sub-plan to a current scheduling queue of the single execution node.

In Example 28, the subject matter of any one of Examples 18-27 includes subject matter where the data set includes one or more files.

In Example 29, the subject matter of any one of Examples 18-28 includes subject matter where the at least one root operator including at least one of a join operator or a union all operator.

Example 30 is a computer-readable medium including instructions that, when executed by one or more processors of a machine, configure the machine to perform operations including: accessing a query plan that includes at least one root operator, the at least one root operator being associated with a plurality of sub-plans; identifying, from the plurality of sub-plans, a sub-plurality of sub-plans that each involves processing a data set that satisfies a set of criteria; estimating a first cost for executing individual sub-plans of the sub-plurality of sub-plans successively using a plurality of execution nodes; estimating a second cost for executing the sub-plurality of sub-plans in parallel using the plurality of execution nodes using the plurality of execution nodes; comparing the first cost to the second cost; determining, based on the comparing, whether the sub-plurality of sub-plans is to be executed in parallel using the plurality of execution nodes; and in response to determining that the sub-plurality of sub-plans is to be executed in parallel using the plurality of execution nodes, causing the sub-plurality of sub-plans to be executed in parallel using the plurality of execution nodes.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
      accessing a query plan that comprises at least one root operator, the at least one root operator being associated with a plurality of sub-plans;
      identifying, from the plurality of sub-plans, a sub-plurality of sub-plans that each involves processing a data set that satisfies a set of criteria;
      estimating a first cost for executing individual sub-plans of the sub-plurality of sub-plans successively using a plurality of execution nodes;
      estimating a second cost for executing the sub-plurality of sub-plans in parallel using the plurality of execution nodes;
      comparing the first cost to the second cost;
      determining, based on the comparing, whether the sub-plurality of sub-plans is to be executed in parallel using the plurality of execution nodes; and
      in response to determining that the sub-plurality of sub-plans is to be executed in parallel using the plurality of execution nodes, causing the sub-plurality of sub-plans to be executed in parallel using the plurality of execution nodes by performing, for each single sub-plan in the sub-plurality of sub-plans, a single scheduling operation to assign execution of an entire portion of the single sub-plan to a single execution node of the plurality of execution nodes, the single execution node being configured to generate a local schedule queue to process the single sub-plan assigned to the single execution node.

2. The system of claim 1, wherein the determining, based on the comparing, whether the sub-plurality of sub-plans is to be executed in parallel using the plurality of execution nodes comprises:
   based on the comparing, determining whether the first cost is greater than the second cost; and
   in response to determining that the first cost is greater than the second cost, determining to execute the sub-plurality of sub-plans in parallel using the plurality of execution nodes.

3. The system of claim 1, wherein the determining, based on the comparing, whether the sub-plurality of sub-plans is to be executed in parallel using the plurality of execution nodes comprises:
   based on the comparing, determining whether the first cost is at least greater than the second cost by a threshold value; and
   in response to determining that the first cost is at least greater than the second cost by the threshold value, determining to execute the sub-plurality of sub-plans in parallel using the plurality of execution nodes.

4. The system of claim 3, wherein the threshold value comprises a ratio of the first cost and the second cost.

5. The system of claim 1, wherein the data set comprises one or more files.

6. The system of claim 1, wherein the at least one root operator comprising a join operator.

7. The system of claim 1, wherein the at least one root operator comprising a union all operator.

8. The system of claim 1, wherein sub-plans in the sub-plurality of sub-plans have a same set of dependencies.

9. The system of claim 8, wherein the operations comprise:
   maintaining a dependency map that describes one or more dependencies between individual operators to be executed, the dependency map being initialized based on the query plan, and the identifying the sub-plurality of sub-plans being based on the dependency map.

10. The system of claim 1, wherein the operations comprise:
    selecting the at least one root operator from a global scheduling queue.

11. The system of claim 1, wherein the set of criteria includes one or more criteria for identifying the data set that is capable of being executed by a single execution node.

12. A method comprising:
    accessing a query plan that comprises at least one root operator, the at least one root operator being associated with a plurality of sub-plans;
    identifying, from the plurality of sub-plans, a sub-plurality of sub-plans that each involves processing a data set that satisfies a set of criteria;
    estimating a first cost for executing individual sub-plans of the sub-plurality of sub-plans successively using a plurality of execution nodes;
    estimating a second cost for executing the sub-plurality of sub-plans in parallel using the plurality of execution nodes;
    comparing the first cost to the second cost;
    determining, based on the comparing, whether the sub-plurality of sub-plans is to be executed in parallel using the plurality of execution nodes; and
    in response to determining that the sub-plurality of sub-plans is to be executed in parallel using the plurality of execution nodes, causing the sub-plurality of sub-plans to be executed in parallel using the plurality of execution nodes by performing, for each single sub-plan in the sub-plurality of sub-plans, a single scheduling operation to assign execution of an entire portion of the single sub-plan to a single execution node of the plurality of execution nodes, the single execution node being configured to generate a local schedule queue to process the single sub-plan assigned to the single execution node.

13. The method of claim 12, wherein the determining, based on the comparing, whether the sub-plurality of sub-plans is to be executed in parallel using the plurality of execution nodes comprises:
   based on the comparing, determining whether the first cost is greater than the second cost; and
   in response to determining that the first cost is greater than the second cost, determining to execute the sub-plurality of sub-plans in parallel using the plurality of execution nodes.

14. The method of claim 12, wherein the determining, based on the comparing, whether the sub-plurality of sub-plans is to be executed in parallel using the plurality of execution nodes comprises:
   based on the comparing, determining whether the first cost is at least greater than the second cost by a threshold value; and
   in response to determining that the first cost is at least greater than the second cost by the threshold value, determining to execute the sub-plurality of sub-plans in parallel using the plurality of execution nodes.

15. The method of claim 14, wherein the threshold value comprises a ratio of the first cost and the second cost.

16. The method of claim 12, wherein the data set comprises one or more files.

17. The method of claim 12, wherein the at least one root operator comprising a join operator.

18. The method of claim 12, wherein the at least one root operator comprising a union all operator.

19. The method of claim 12, wherein sub-plans in the sub-plurality of sub-plans have a same set of dependencies.

20. The method of claim 19, comprising:
   maintaining a dependency map that describes one or more dependencies between individual operators to be executed, the dependency map being initialized based on the query plan, and the identifying the sub-plurality of sub-plans being based on the dependency map.

21. The method of claim 12, comprising:
   selecting the at least one root operator from a global scheduling queue.

22. The method of claim 12, wherein the set of criteria includes one or more criteria for identifying the data set that is capable of being executed by a single execution node.

23. A non-transitory computer-readable medium comprising instructions that, when executed by one or more processors of a machine, configure the machine to perform operations comprising:
   accessing a query plan that comprises at least one root operator, the at least one root operator being associated with a plurality of sub-plans;
   identifying, from the plurality of sub-plans, a sub-plurality of sub-plans that each involves processing a data set that satisfies a set of criteria;
   estimating a first cost for executing individual sub-plans of the sub-plurality of sub-plans successively using a plurality of execution nodes;
   estimating a second cost for executing the sub-plurality of sub-plans in parallel using the plurality of execution nodes;
   comparing the first cost to the second cost;
   determining, based on the comparing, whether the sub-plurality of sub-plans is to be executed in parallel using the plurality of execution nodes; and
   in response to determining that the sub-plurality of sub-plans is to be executed in parallel using the plurality of execution nodes, causing the sub-plurality of sub-plans to be executed in parallel using the plurality of execution nodes by performing, for each single sub-plan in the sub-plurality of sub-plans, a single scheduling operation to assign execution of an entire portion of the single sub-plan to a single execution node of the plurality of execution nodes, the single execution node being configured to generate a local schedule queue to process the single sub-plan assigned to the single execution node.

24. The non-transitory computer-readable medium of claim 23, wherein the determining, based on the comparing, whether the sub-plurality of sub-plans is to be executed in parallel using the plurality of execution nodes comprises:
   based on the comparing, determining whether the first cost is greater than the second cost; and
   in response to determining that the first cost is greater than the second cost, determining to execute the sub-plurality of sub-plans in parallel using the plurality of execution nodes.

25. The non-transitory computer-readable medium of claim 23, wherein the determining, based on the comparing, whether the sub-plurality of sub-plans is to be executed in parallel using the plurality of execution nodes comprises:
   based on the comparing, determining whether the first cost is at least greater than the second cost by a threshold value; and
   in response to determining that the first cost is at least greater than the second cost by the threshold value, determining to execute the sub-plurality of sub-plans in parallel using the plurality of execution nodes.

26. The non-transitory computer-readable medium of claim 25, wherein the threshold value comprises a ratio of the first cost and the second cost.

27. The non-transitory computer-readable medium of claim 23, wherein the data set comprises one or more files.

28. The non-transitory computer-readable medium of claim 23, wherein the at least one root operator comprising a join operator.

29. The non-transitory computer-readable medium of claim 23, wherein the at least one root operator comprising a union all operator.

30. The non-transitory computer-readable medium of claim 23, wherein sub-plans in the sub-plurality of sub-plans have a same set of dependencies.

* * * * *